US008609782B2

(12) United States Patent
Obrecht et al.

(10) Patent No.: US 8,609,782 B2
(45) Date of Patent: Dec. 17, 2013

(54) PROCESS FOR DEGRADING NITRILE RUBBERS IN THE PRESENCE OF CATALYSTS HAVING AN INCREASED ACTIVITY

(75) Inventors: Werner Obrecht, Moers (DE); Christopher Ong, Leverkusen (DE); Julia Maria Müller, Blaustein (DE); Oskar Nuyken, München (DE)

(73) Assignee: LANXESS Deutschland GmbH, Cologne (DE)

( * ) Notice: Subject to any disclaimer, the term of this patent is extended or adjusted under 35 U.S.C. 154(b) by 0 days.

(21) Appl. No.: 11/707,423

(22) Filed: Feb. 16, 2007

(65) Prior Publication Data

US 2008/0064822 A1 Mar. 13, 2008

(30) Foreign Application Priority Data

Feb. 22, 2006 (DE) .......................... 10 2006 008 521

(51) Int. Cl.
*C08F 36/02* (2006.01)
*C08F 20/44* (2006.01)
*C08F 220/44* (2006.01)

(52) U.S. Cl.
USPC ........ 525/329.3; 525/338; 525/351; 525/370; 525/359.4; 502/152; 502/155; 502/407

(58) Field of Classification Search
USPC .............. 525/338, 351, 370, 359.4; 502/152, 502/155, 407
See application file for complete search history.

(56) References Cited

U.S. PATENT DOCUMENTS

| | | | |
|---|---|---|---|
| 3,700,637 A | 10/1972 | Finch, Jr. ...................... | 260/83.3 |
| 4,464,515 A | 8/1984 | Rempel et al. ................ | 525/338 |
| 4,503,196 A | 3/1985 | Rempel et al. ................ | 525/338 |
| 4,581,417 A | 4/1986 | Buding et al. ................ | 525/338 |
| 4,631,315 A | 12/1986 | Buding et al. ................ | 525/338 |
| 4,746,707 A | 5/1988 | Fiedler et al. ................ | 525/338 |
| 4,795,788 A | 1/1989 | Himmler et al. ............. | 525/338 |
| 4,978,771 A | 12/1990 | Fiedler et al. ................ | 558/459 |
| 5,403,566 A * | 4/1995 | Panster et al. .................. | 423/22 |
| 6,403,802 B1 * | 6/2002 | Nolan et al. .................. | 548/103 |
| 6,620,955 B1 * | 9/2003 | Pederson et al. ............. | 556/21 |
| 6,683,136 B2 | 1/2004 | Guo et al. ................ | 525/329.3 |
| 6,838,489 B2 * | 1/2005 | Bell et al. ....................... | 522/63 |
| 7,632,772 B2 | 12/2009 | Shan | |
| 2002/0107138 A1 * | 8/2002 | Hoveyda et al. ............. | 502/152 |
| 2002/0137978 A1 * | 9/2002 | Grubbs et al. ................ | 585/507 |
| 2004/0127647 A1 * | 7/2004 | Ong et al. ..................... | 525/191 |
| 2004/0132891 A1 | 7/2004 | Ong et al. ..................... | 524/492 |
| 2007/0043180 A1 * | 2/2007 | Zhan .............................. | 526/90 |

FOREIGN PATENT DOCUMENTS

| | | |
|---|---|---|
| DE | 25 39 132 | 4/1987 |
| EP | 0 419 952 | 4/1991 |
| EP | 0 471 250 | 2/1992 |
| EP | 0 298 386 | 10/1994 |
| WO | 96/04289 | 2/1996 |
| WO | 97/06185 | 2/1997 |
| WO | 00/71554 | 11/2000 |
| WO | 02/100905 | 12/2002 |
| WO | 02/100941 | 12/2002 |
| WO | 03/002613 | 1/2003 |
| WO | 2004/035596 | 4/2004 |
| WO | 2005/080456 | 9/2005 |

OTHER PUBLICATIONS

Halbach et al., Novel Ruthenium-Based Metathesis Catalysts Containing Electron-Withdrawing Ligands: Synthesis, Immobilization, and Reactivity, J.Org. Chem 2005, 70, 4687-4694.*
Jafarpour et al., Development of olefin metathesis catalyst precursors bearing nucleophilic carbene ligands, Journal of Organometallic Chemistry 617-618 (2001) pp. 17-27.*
Halbach et al., Novel Ruthenium-Based Metathesis Catalysts Containing Electron-Withdrawing Ligands: Synthesis, Immobilization, and Reactivity, J. Org. Chem. 2005, 70, 4687-4694.*
Acrylonitrile-butadiene Rubber (NBR), IISRP, Feb. 2002.*
Nitrile Rubber Definition, Hawley's Condensed Chemical Dictionary, 14th Edition, 2002.*
Angew Chem. Int. Ed. 2003, 42, 4592-4633 Richard R. Schrock and Amir H. Hoveyda; "Molyb-denum and Tungsten Imido Alkylidene Complexes as Efficient Olefin-Metathesis Catalysts".
Eur. J. Org. Chem. 2003, 963-966; Karol Grela and Mikhail Kim; "A Good Bargain: An inexpensive Air-Stable Ruthenium Metathesis Catalyst Derived from α-Asarone".
Angew Chem. Int. Ed. 2002, 41, 4038-4040; Karol Grela, Syuzanna Harutyunyan, and Anna Michrowska; "A Highly Efficient Ruthenium Catalyst for Metathesis Reactions".
J. Org. Chem. 2004, 69, 6894-96; R. Bujok et al; "Ortho- and Para-Substituted Hoveyda-Grubbs Carbenes. An Improved Synthesis of Highly Efficient Metathesis Initiators".
Chem Eur. J. 2004, 10, 777-784; Krause et al; "Synthesis and Reactivity of Homogeneous and Heterogeneous Ruthenium-Based Metathesis Catalysts Containing Electron-Withdrawing Ligands".
Angew. Chem. Int. Ed. 2004, 43, 6161-6165; Olefin Metathesis; "Rapidly Initiating Ruthenium Olefin-Metathesis Catalysts" Patricio E. Romero, Warren E. Piers, and Robert McDonald.
European Search Report dated Oct. 5, 2009.
Cossy, Janine et al.; Journal of Organometallic Chemistry 634, (2001) pp. 216-221; "Cross-metathesis reaction. Generation of highly functionalized olefins from unsaturated alcohols".
Bouzbouz, Samir et al.; Organic Letters, (2004), vol. 6, No. 20, pp. 3465-3467; Regioselective Cross-Metathesis Reaction induced by Steric Hindrance.
Bai et al.; "Lewis acid assisted cross metathesis of acrylonitrile with functionalized olefins catalyzed by phosphine-free ruthenium carbene complex" Org. Biomol. Chem., 2005, 3, pp. 4139-4142.

* cited by examiner

*Primary Examiner* — Robert C Boyle
(74) *Attorney, Agent, or Firm* — Jennifer R. Seng

(57) ABSTRACT

A process of degrading nitrile rubbers comprises subjecting them to a metathesis reaction in the presence of specific catalysts with increased activity.

32 Claims, No Drawings

PROCESS FOR DEGRADING NITRILE RUBBERS IN THE PRESENCE OF CATALYSTS HAVING AN INCREASED ACTIVITY

FIELD OF THE INVENTION

The present invention relates to a process for degrading nitrile rubbers by subjecting such nitrile rubbers to a metathesis reaction in the presence of specific catalysts.

BACKGROUND OF THE INVENTION

The term nitrile rubber, also referred to as "NBR" for short, refers to rubbers which are copolymers or terpolymers of at least one α,β-unsaturated nitrile, at least one conjugated diene and, if desired, one or more further copolymerizable monomers.

Hydrogenated nitrile rubber, also referred to as "HNBR" for short, is produced by hydrogenation of nitrile rubber. Accordingly, the C=C double bonds of the copolymerized diene units have been completely or partly hydrogenated in HNBR. The degree of hydrogenation of the copolymerized diene units is usually in the range from 50 to 100%.

Hydrogenated nitrile rubber is a specialty rubber which has very good heat resistance, an excellent resistance to ozone and chemicals and also an excellent oil resistance.

The abovementioned physical and chemical properties of HNBR are associated with very good mechanical properties, in particular a high abrasion resistance. For this reason, HNBR has found wide use in a variety of applications. HNBR is used, for example, for seals, hoses, belts and clamping elements in the automobile sector, also for stators, oil well seals and valve seals in the field of oil extraction and also for numerous parts in the aircraft industry, the electronics industry, mechanical engineering and shipbuilding.

Commercially available HNBR grades usually have a Mooney viscosity (ML 1+4 at 100° C.) in the range from 55 to 105, which corresponds to a weight average molecular weight $M_w$ (method of determination: gel permeation chromatography (GPC) against polystyrene equivalents) in the range from about 200 000 to 500 000. The polydispersity index PDI (PDI=$M_w/M_n$, where $M_w$ is the weight average molecular weight and $M_n$ is the number average molecular weight), which gives information about the width of the molecular weight distribution, measured here is frequently 3 or above. The residual double bond content is usually in the range from 1 to 18% (determined by IR spectroscopy).

The processability of HNBR is subject to severe restrictions as a result of the relatively high Mooney viscosity. For many applications, it would be desirable to have an HNBR grade which has a lower molecular weight and thus a lower Mooney viscosity. This would decisively improve the processability.

Numerous attempts have been made in the past to shorten the chain length of HNBR by degradation. For example, the molecular weight can be decreased by thermomechanical treatment (mastication), e.g. on a roll mill or in a screw apparatus (EP-A-0 419 952). However, this thermomechanical degradation has the disadvantage that functional groups such as hydroxyl, keto, carboxyl and ester groups, are incorporated into the molecule as a result of partial oxidation and, in addition, the microstructure of the polymer is substantially altered.

The preparation of HNBR having low molar masses corresponding to a Mooney viscosity (ML 1+4 at 100° C.) in the range below 55 or a number average molecular weight of about $M_n$<200 000 g/mol was for a long time not possible by means of established production processes since, firstly, a steep increase in the Mooney viscosity occurs in the hydrogenation of NBR and, secondly, the molar mass of the NBR feedstock used for the hydrogenation cannot be reduced at will since otherwise the work-up can no longer be carried out in the industrial plants available because the product is too sticky. The lowest Mooney viscosity of an NBR feedstock which can be processed without difficulties in an established industrial plant is about 30 Mooney units (ML 1+4 at 100° C.). The Mooney viscosity of the hydrogenated nitrile rubber obtained using such an NBR feedstock is in the order of 55 Mooney units (ML 1+4 at 100° C.).

In the more recent prior art, this problem is solved by reducing the molecular weight of the nitrile rubber prior to hydrogenation by degradation to a Mooney viscosity (ML 1+4 at 100° C.) of less than 30 Mooney units or a number average molecular weight of $M_n$<70 000 g/mol. The decrease in the molecular weight is achieved here by metathesis in which low molecular weight 1-olefins are usually added. The metathesis reaction is advantageously carried out in the same solvent as the hydrogenation reaction (in situ) so that the degraded NBR feedstock does not have to be isolated from the solvent after the degradation reaction is complete before it is subjected to the subsequent hydrogenation. Metathesis catalysts which have a tolerance towards polar groups, in particular towards nitrile groups, are used for catalysing the metathetic degradation reaction.

WO-A-02/100905 and WO-A02/100941 describe a process which comprises degradation of nitrile rubber starting polymers by olefin metathesis and subsequent hydrogenation. Here, a nitrile rubber is reacted in a first step in the presence of a coolefin and a specific catalyst based on osmium, ruthenium, molybdenum or tungsten complexes and hydrogenated in a second step. Hydrogenated nitrite rubbers having a weight average molecular weight ($M_w$) in the range from 30 000 to 250 000, a Mooney viscosity (ML 1+4 at 100° C.) in the range from 3 to 50 and a polydispersity index PDI of less than 2.5 can be obtained by this route according to WO-A-02/100941.

Metathesis catalysts are known, inter alia, from WO-A-96/04289 and WO-A-97/06185. They have the following in-principle structure:

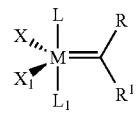

where M is osmium or ruthenium, R and $R_1$ are organic radicals having a wide range of structural variation, X and $X_1$ are anionic ligands and L and $L_1$ are uncharged electron donors. The customary term "anionic ligands" is used in the literature regarding such metathesis catalysts to describe ligands which are always negatively charged with a closed electron shell when regarded separately from the metal centre.

Such catalysts are suitable for ring-closing metatheses (RCM), cross-metatheses (CM) and ring-opening metatheses (ROMP). However, the catalysts mentioned are not necessarily suitable for carrying out the degradation of nitrile rubber.

The metathesis of nitrite rubber can be successfully carried out using some catalysts from the group of "Grubbs (I) catalysts". A suitable catalyst is, for example, a ruthenium catalyst having particular substitution patterns, e.g. the catalyst bis(tricyclohexylphosphine)benzylideneruthenium dichloride shown below.

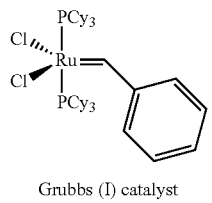

Grubbs (I) catalyst

After metathesis and hydrogenation, the nitrile rubbers have a lower molecular weight and also a narrower molecular weight distribution than the hydrogenated nitrile rubbers which have hitherto been able to be prepared according to the prior art.

However, the amounts of Grubbs (I) catalyst employed for carrying out the metathesis are large. In the experiments in WO-A-031002613, they are, for example, 307 ppm and 61 ppm of Ru based on the nitrile rubber used. The reaction times necessary are also long and the molecular weights after the degradation are still relatively high (see Example 3 of WO-A-03/002613, in which $M_w$=180 000 g/mol and $M_n$=71 000 g/mol).

US 2004/0127647 A1 describes blends based on low molecular weight HNBR rubbers having a bimodal or multimodal molecular weight distribution and also vulcanisates of these rubbers. To carry out the metathesis, 0.5 phr of Grubbs I catalyst, corresponding to 614 ppm of ruthenium based on the nitrile rubber used, is used according to the examples.

Furthermore, WO-A-00/71554 discloses a group of catalysts which are known in the technical field as "Grubbs (II) catalysts".

If such a "Grubbs (II) catalyst", e.g. 1,3-bis(2,4,6-trimethylphenyl)-2-imidazolidenylidene)(tricyclohexylphosphine) ruthenium(phenylmethylene) dichloride, is used for the NBR metathesis, this also succeeds without use of a coolefin (US-A-2004/0132891). After the subsequent hydrogenation, which is preferably carried out in situ, the hydrogenated nitrile rubber has lower molecular weights and a narrower molecular weight distribution (PDI) than when using catalysts of the Grubbs (I) type. In terms of the molecular weight and the molecular weight distribution, the metathetic degradation thus proceeds more efficiently when using catalysts of the Grubbs II type than when using catalysts of the Grubbs I type. However, the amounts of ruthenium necessary for this efficient metathetic degradation are still relatively high. Long reaction times are also still required for carrying out the metathesis using the Grubbs II catalyst.

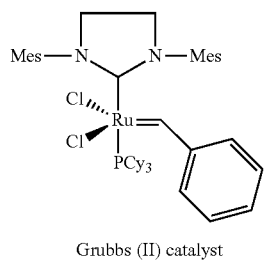

Grubbs (II) catalyst

In all the abovementioned processes for the metathetic degradation of nitrite rubber, relatively large amounts of catalyst have to be used and long reaction times are required in order to produce the desired low molecular weight nitrite rubbers.

SUMMARY OF THE INVENTION

It is therefore an object of the invention to provide a catalyst which makes metathetic degradation of nitrile rubber without gelling possible, at the same time at a higher activity than the metathesis catalysts available at present and thus makes possible an increase in the reaction rate and the setting of lower molecular weights of the degraded nitrite rubber at a comparable noble metal content.

This object has surprisingly been able to be achieved by a process for degrading nitrile rubbers by subjecting them to a metathesis reaction in the presence of specific catalysts of the general formula (I) shown below.

DETAILED DESCRIPTION OF THE INVENTION

The invention provides for a process for degrading nitrile rubbers comprising subjecting such nitrite rubbers to a metathesis reaction in the presence of a catalyst of the general formula (I)

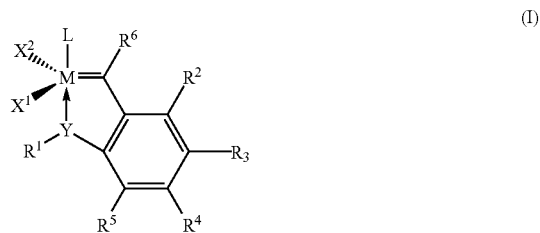

(I)

where
M is ruthenium or osmium,
Y is oxygen (O), sulphur (S), an N—$R^1$ radical or a P—$R^1$ radical, where $R^1$ is as defined below,
$X^1$ and $X^2$ are identical or different ligands,
$R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, halogen, alkoxy, aryl or heteroaryl radicals,
$R^2$, $R^3$, $R^4$ and $R^5$ are identical or different and are each hydrogen, organic or inorganic radicals,
$R^6$ is hydrogen or an alkyl, alkenyl, alkynyl or aryl radical and
L is a ligand.

The catalysts of the general formula (I) are known in principle. Representatives of this class of compounds are the catalysts described by Hoveyda et al. in US 2002/0107138 A1 and Angew Chem. Int. Ed. 2003, 42, 4592, and the catalysts described by Grela in WO-A-2004/035596, Eur. J. Org. Chem 2003, 963-966 and Angew. Chem. Int. Ed. 2002, 41, 4038 and in J. Org. Chem. 2004, 69, 6894-96 and Chem. Eur. J 2004, 10, 777-784. The catalysts are commercially available or can be prepared as described in the references cited.

It is surprisingly possible to carry out the metathetic degradation of nitrile rubber without gel formation using the catalysts having the structural features of the general formula (I), with such catalysts additionally displaying a higher activity than Grubbs II catalysts.

The term "substituted" used for the purposes of the present patent application means that a hydrogen atom on an indicated radical or atom has been replaced by one of the groups indicated in each case, with the proviso that the valency of the atom indicated is not exceeded and the substitution leads to a stable compound.

For the purposes of the present patent application and invention, all the definitions of radicals, parameters or explanations given above or below in general terms or in preferred ranges can be combined with one another in any way, i.e. including combinations of the respective ranges and preferred ranges.

In the catalysts of the general formula (I), L is a ligand, usually a ligand having an electron donor function. L can be a $P(R^7)_3$ radical, where the radicals $R^7$ are each, independently of one another, $C_1$-$C_6$-alkyl, $C_3$-$C_8$-cycloalkyl or aryl or a substituted or unsubstituted imidazolidine radical ("Im").

$C_1$-$C_6$-Alkyl is, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl or n-hexyl.

$C_3$-$C_8$-Cycloalkyl encompasses cyclopropyl, cyclobutyl, cyclopentyl, cyclohexyl, cycloheptyl and cyclooctyl.

Aryl encompasses an aromatic radical having from 6 to 24 skeletal carbon atoms. Preferred monocyclic, bicyclic or tricyclic carbocyclic aromatic radicals having from 6 to 10 skeletal carbon atoms are, for example, phenyl, biphenyl, naphthyl, phenanthrenyl and anthracenyl.

The imidazolidine radical (Im) usually has a structure of the general formula (IIa) or (IIb),

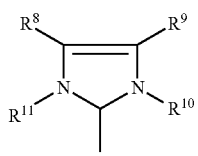

(IIa)

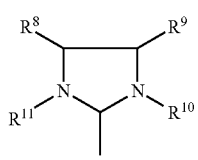

(IIb)

where
$R^8$, $R^9$, $R^{10}$, $R^{11}$ are identical or different and are each hydrogen, straight-chain or branched $C_1$-$C_{30}$-alkyl, preferably $C_1$-$C_{20}$-alkyl, $C_3$-$C_{20}$-cycloalkyl, preferably $C_3$-$C_{10}$-cycloalkyl, $C_2$-$C_{20}$-alkenyl, preferably $C_2$-$C_{10}$-alkenyl, $C_2$-$C_{20}$-alkynyl, preferably $C_2$-$C_{10}$-alkynyl, $C_6$-$C_{24}$-aryl, preferably $C_6$-$C_{14}$-aryl, $C_1$-$C_{20}$carboxylate, preferably $C_1$-$C_{10}$-carboxylate, $C_1$-$C_{20}$-alkoxy, preferably $C_1$-$C_{10}$-alkoxy, $C_2$-$C_{20}$-alkenyloxy, preferably $C_2$-$C_{10}$-alkenyloxy, $C_2$-$C_{20}$-alkynyloxy, preferably $C_2$-$C_{10}$-alkynyloxy, $C_6$-$C_{20}$-aryloxy, preferably $C_6$-$C_{14}$-aryloxy, $C_2$-$C_{20}$-alkoxycarbonyl, preferably $C_2$-$C_{10}$-alkoxycarbonyl, $C_1$-$C_{20}$-alkylthio, preferably $C_1$-$C_{10}$-alkylthio, $C_6$-$C_{20}$-arylthio, preferably $C_6$-$C_{14}$-arylthio, $C_1$-$C_{20}$-alkylsulphonyl, preferably $C_1$-$C_{10}$-alkylsulphonyl, $C_1$-$C_{20}$-alkylsulphonate, preferably $C_1$-$C_{10}$-alkylsulphonate, $C_6$-$C_{20}$-arylsulphonate, preferably $C_6$-$C_{14}$-arylsulphonate, or $C_1$-$C_{20}$-alkylsulphinyl, preferably $C_1$-$C_{10}$-alkylsulphinyl.

One or more of the radicals $R^8$, $R^9$, $R^{10}$, $R^{11}$ may, independently of one another, optionally be substituted by one or more substituents, preferably straight-chain or branched $C_1$-$C_{10}$-alkyl, $C_3$-$C_8$-cycloalkyl $C_1$-$C_{10}$-alkoxy or $C_6$-$C_{24}$-aryl, where these abovementioned substituents may in turn be substituted by one or more radicals, preferably selected from the group consisting of halogen, in particular chlorine or bromine, $C_1$-$C_5$-alkyl, $C_1$-$C_5$-alkoxy and phenyl.

In a preferred embodiment of the novel catalysts of the general formula (I), $R^8$ and $R^9$ are each, independently of one another, hydrogen, $C_6$-$C_{24}$-aryl, particularly preferably phenyl, straight-chain or branched $C_1$-$C_{10}$-alkyl, particularly preferably propyl or butyl, or together form, with inclusion of the carbon atoms to which they are bound, a cycloalkyl or aryl radical, where all the abovementioned radicals may in turn be substituted by one or more further radicals selected from the group consisting of straight-chain or branched $C_1$-$C_{10}$-alkyl, $C_1$-$C_{10}$-alkoxy, $C_6$-$C_{24}$-aryl and functional groups selected from the group consisting of hydroxy, thiol, thioether, ketone, aldehyde, ester, ether, amine, imine, amide, nitro, carboxyl, disulphide, carbonate, isocyanate, carbodiimide, carboalkoxy, carbamate and halogen.

In a preferred embodiment of the novel catalysts, the radicals $R^{10}$ and $R^{11}$ are identical or different and are each straight-chain or branched $C_1$-$C_{10}$-alkyl, particularly preferably i-propyl or neopentyl, $C_3$-$C_{10}$-cycloalkyl, preferably adamantyl, $C_6$-$C_{24}$-aryl, particularly preferably phenyl, $C_1$-$C_{10}$-alkylsulphonate, particularly preferably methanesulphonate, $C_6$-$C_{10}$-arylsulphonate, particularly preferably p-toluenesulphonate.

These radicals $R^{10}$ and $R^{11}$ which are mentioned above as being preferred may optionally be substituted by one or more further radicals selected from the group consisting of straight-chain or branched $C_1$-$C_5$-alkyl, in particular methyl, $C_1$-$C_5$-alkoxy, aryl and functional groups selected from the group consisting of hydroxy, thiol, thioether, ketone, aldehyde, ester, ether, amine, imine, amide, nitro, carboxyl, disulphide, carbonate, isocyanate, carbodiimide, carboalkoxy, carbamate and halogen.

In particular, the radicals $R^{10}$ and $R^{11}$ are identical or different and are each i-propyl, neopentyl, adamantyl or mesityl.

Particularly preferred imidazolidine radicals (Im) have the structures (IIIa-f), where Mes is in each caes a 2,4,6-trimethylphenyl radical.

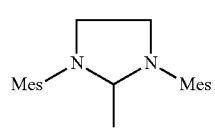

(IIIa)

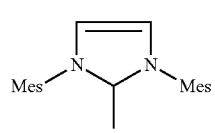

(IIIb)

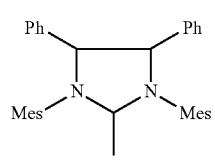

(IIIc)

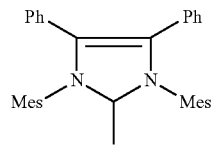

(IIId)

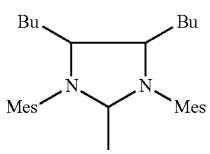

(IIIe)

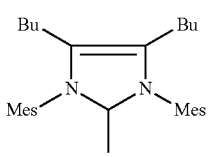

(IIIf)

In the catalysts of the general formula (I), $X^1$ and $X^2$ are identical or different and can be, for example, hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or $C_1$-$C_{20}$-alkylsulphinyl.

The abovementioned radicals $X^1$ and $X^2$ can also be substituted by one or more further radicals, for example by halogen, preferably fluorine, $C_1$-$C_{10}$-alkyl, $C_1$-$C_{10}$alkoxy or $C_6$-$C_{24}$-aryl radicals, where the latter radicals may optionally also in turn be substituted by one or more substituents selected from the group consisting of halogen, preferably fluorine, $C_1$-$C_5$-alkyl, $C_1$-$C_5$-alkoxy and phenyl.

In a preferred embodiment, $X^1$ and $X^2$ are identical or different and are each halogen, in particular fluorine, chlorine or bromine, benzoate, $C_1$-$C_5$carboxylate, $C_1$-$C_5$-alkyl, phenoxy, $C_1$-$C_5$alkoxy, $C_1$-$C_5$-alkylthiol, $C_6$-$C_{24}$-arylthiol, $C_6$-$C_{24}$-aryl or $C_1$-$C_5$-alkylsulphonate.

In a particularly preferred embodiment, $X^1$ and $X^2$ are identical and are each halogen, in particular chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulphonate).

In the general formula (I), the radical $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, halogen, alkoxy, aryl or heteroaryl radicals.

The radical $R^1$ is usually a $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphinyl radical, each of which may optionally be substituted by one or more alkyl, halogen, alkoxy, aryl or heteroaryl radicals.

$R^1$ is preferably a $C_3$-$C_{20}$-cycloalkyl radical, a $C_6$-$C_{24}$-aryl radical or a straight-chain or branched $C_1$-$C_{30}$-alkyl radical, with the latter optionally being able to be interrupted by one or more double or triple bonds or one or more heteroatoms, preferably oxygen or nitrogen. $R^1$ is particularly preferably a straight-chain or branched $C_1$-$C_{12}$-alkyl radical.

The $C_3$-$C_{20}$-cycloalkyl radical encompasses, for example, cyclopropyl, cyclobutyl, cyclopentyl, cyclohexyl, cycloheptyl and cyclooctyl.

The $C_1$-$C_{12}$-alkyl radical can be, for example, methyl, ethyl, n-propyl, isopropyl, n-butyl, sec-butyl, tert-butyl, n-pentyl, 1-methylbutyl, 2-methylbutyl, 3-methylbutyl, neo-pentyl, 1-ethylpropyl, n hexyl, n-heptyl, n-octyl, n-decyl or n-dodecyl. In particular, $R^1$ is methyl or isopropyl.

The $C_6$-$C_{24}$-aryl radical is an aromatic radical having from 6 to 24 skeletal carbon atoms. As particularly preferred monocyclic, bicyclic or tricyclic carbocyclic aromatic radicals having from 6 to 10 skeletal carbon atoms, mention may be made by way of example of phenyl, biphenyl, naphthyl, phenanthrenyl or anthracenyl.

In the general formula (I), the radicals $R^2$, $R^3$, $R^4$ and $R^5$ are identical or different and can be hydrogen, organic or inorganic radicals.

In a preferred embodiment, $R^2$, $R^3$, $R^4$, $R^5$ are identical or different and are each hydrogen, halogen, nitro, $CF_3$, alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl, each of which may optionally be substituted by one or more alkyl, alkoxy, halogen, aryl or heteroaryl radicals.

$R^2$, $R^3$, $R^4$, $R^5$ are usually identical or different and are each hydrogen, halogen, preferably chlorine or bromine, nitro, $CF_3$, $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphinyl, each of which may optionally be substituted by one or more $C_1$-$C_{30}$-alkyl, $C_1$-$C_{20}$-alkoxy, halogen, $C_6$-$C_{24}$-aryl or heteroaryl radicals.

In a particularly useful embodiment, $R^2$, $R^3$, $R^4$, $R^5$ are identical or different and are each nitro, a straight-chain or branched $C_1$-$C_{30}$-alkyl or $C_6$-$C_{20}$-cycloalkyl radical, a straight-chain or branched $C_1$-$C_{20}$-alkoxy radical or a $C_6$-$C_{24}$-aryl radical, preferably phenyl or naphthyl. The $C_1$-$C_{30}$-alkyl radicals and $C_1$-$C_{20}$-alkoxy radicals may optionally be interrupted by one or more double or triple bonds or one or more heteroatoms, preferably oxygen or nitrogen.

Furthermore, two or more of the radicals $R^2$, $R^3$, $R^4$ or $R^5$ can be bridged via aliphatic or aromatic structures. For example, $R^3$ and $R^4$ can, with inclusion of the carbon atoms to which they are bound in the phenyl ring of the formula (I), form a fused-on phenyl ring so that overall a naphthyl structure results.

In the general formula (I), $R^6$ is hydrogen or an alkyl, alkenyl, alkynyl or aryl radical. $R^6$ is preferably hydrogen or a $C_1$-$C_{30}$-alkyl radical, a $C_2$-$C_{20}$-alkenyl radical, a $C_2$-$C_{20}$-alkynyl radical or a $C_6$-$C_{24}$-aryl radical. $R^6$ is particularly preferably hydrogen.

Particularly suitable catalysts for the process according to the invention are catalysts of the general formula (IV)

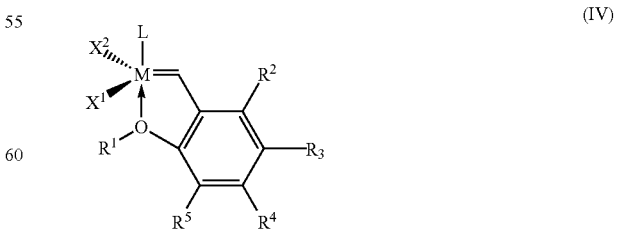

(IV)

where
M, L, $X^1$, $X^2$, $R^1$, $R^2$, $R^3$, $R^4$ and $R^5$ have the meanings given for the general formula (I).

These catalysts are known in principle, for example from US 2002/0107138 A1 (Hoveyda et al.), and can be obtained by preparative methods indicated there.

Particular preference is given to catalysts of the general formula (IV) in which M is ruthenium,
$X^1$ and $X^2$ are both halogen, in particular, both chlorine,
$R^1$ is a straight-chain or branched $C_1$-$C_{12}$-alkyl radical,
$R^2$, $R^3$, $R^4$, $R^5$ have the meanings given for the general formula (I) and
L has the meanings given for the general formula (I).

Very particular preference is given to catalysts of the general formula (IV) in which M is ruthenium,
$X^1$ and $X^2$ are both chlorine,
$R^1$ is an isopropyl radical,
$R^2$, $R^3$, $R^4$, $R^5$ are all hydrogen and
L is a substituted or unsubstituted imidazolidine radical of the formula (IIa) or (IIb),

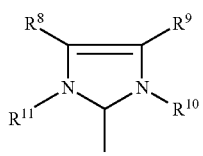

(IIa)

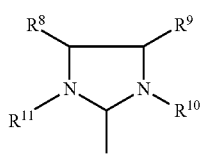

(IIb)

where
$R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_6$-$C_{24}$-arylthio, $C_1$-$C_{20}$-alkylsulphonyl, $C_1$-$C_{20}$-alkylsulphonate, $C_6$-$C_{24}$-arylsulphonate or $C_1$-$C_{20}$-alkylsulphinyl.

A very particularly preferred catalyst which comes under the general structural formula (IV) is that of the formula (V)

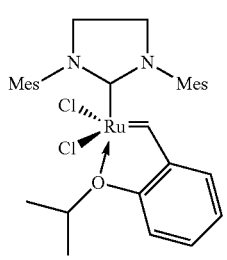

(V)

which is also referred to as "Hoveyda catalyst" in the literature.

Further suitable catalysts which come under the general structural formula (IV) are those of the formulae (VI), (VII), (VIII), (IX), (X), (XI), (XII) and (IXX), where Mes is in each case a 2,4,6-trimethylphenyl radical.

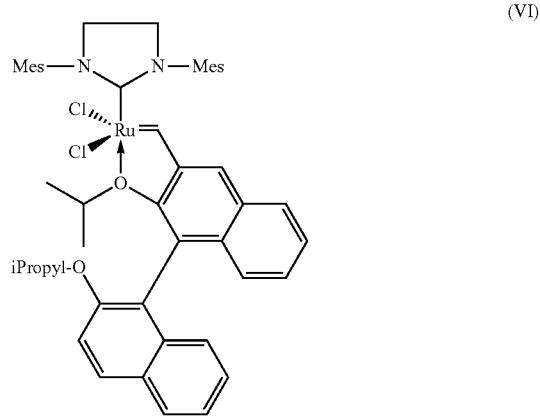

(VI)

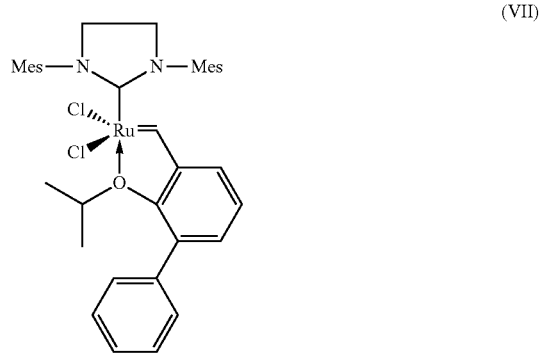

(VII)

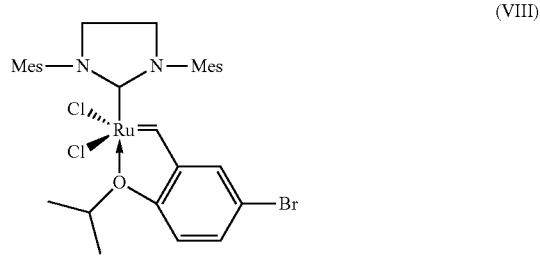

(VIII)

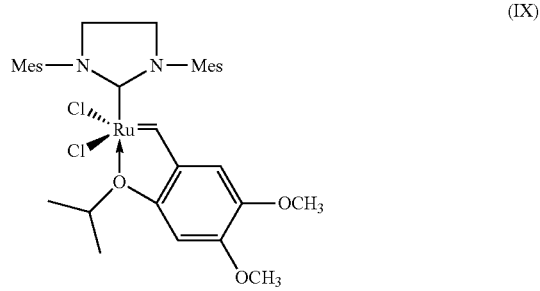

(IX)

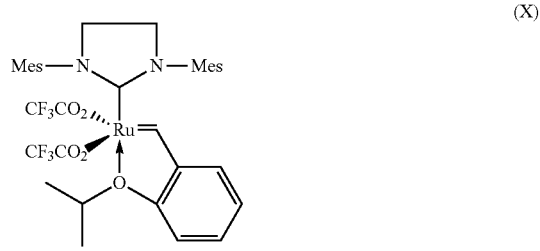

(X)

-continued

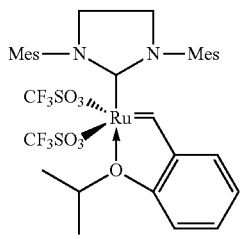

(XI)

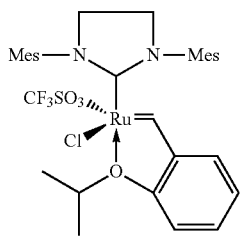

(XII)

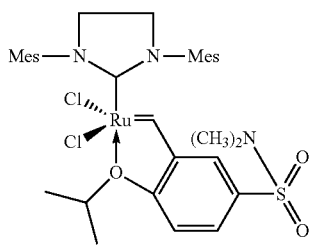

(IXX)

Further catalysts which are particularly suitable for the process according to the invention are catalysts of the general formula (XIII)

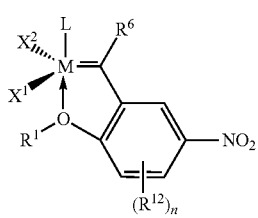

(XIII)

where

M, L, $X^1$, $X^2$, $R^1$ and $R^6$ have the meanings given for the general formula (I), the radicals $R^{12}$ are identical or different and have the meanings given for the radicals $R^2$, $R^3$, $R^4$ and $R^5$, with the exception of hydrogen, and n is 0, 1, 2 or 3.

These catalysts are known in principle, for example from WO-A-2004/035596 (Grela), and can be obtained by the preparative methods indicated there.

Particular preference is given to catalysts of the general formula (XIII) in which M is ruthenium, $X^1$ and $X^2$ are both halogen, in particular both chlorine, $R^1$ is a straight-chain or branched $C_1$-$C_{12}$-alkyl radical, $R^{12}$ has the meanings given for the general formula (I), n is 0, 1, 2 or 3 and L has the meanings given for the general formula (I).

Very particular preference is given to catalysts of the general formula (XIII) in which M is ruthenium, $X^1$ and $X^2$ are both chlorine, $R^1$ is an isopropyl radical, n is 0 and L is a substituted or unsubstituted imidazolidine radical of the formula (IIa) or (IIb),

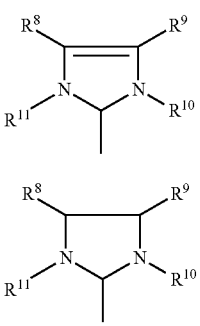

(IIa)

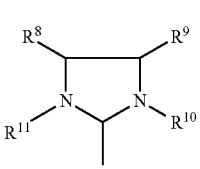

(IIb)

where $R^1$, $R^9$, $R^{10}$, $R^{11}$ are identical or different and are each hydrogen, straight-chain or branched, cyclic or acyclic $C_1$-$C_{30}$-alkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_4$-arylthio, $C_1$-$C_{20}$-alkylsulphonyl, $C_1$-$C_{20}$-alkylsulphonate, $C_6$-$C_4$-arylsulphonate or $C_1$-$C_{20}$-alkylsulphinyl.

A particularly suitable catalyst which comes under the general formula (XIII) has the structure (XIV)

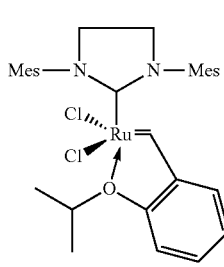

(XIV)

and is also referred to in the literature as "Grela catalyst".

A further suitable catalyst which comes under the general formula (XII) has the structure (XV).

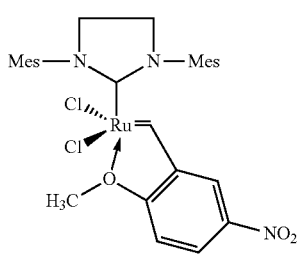

(XV)

In an alternative embodiment, it is also possible to use dendritic catalysts of the general formula (XVI),

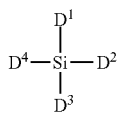 (XVI)

where $D^1$, $D^2$, $D^3$ and $D^4$ each have a structure of the general formula (XVII) which is bound via the methylene group to the silicon of the formula (XVI),

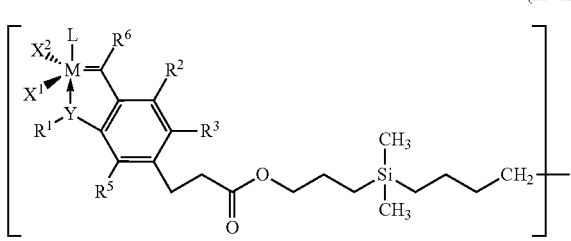 (XVII)

where
M, L, $X^1$, $X^2$, $R^1$, $R^2$, $R^3$, $R^5$ and $R^6$ have the meanings given for the general formula (I) or can have the meanings given for all the abovementioned preferred or particularly preferred embodiments.

Such catalysts of the general formula (XVI) are known from US 2002/0107138 A1 and can be prepared according to the information given there.

In a further alternative embodiment, it is possible to perform the inventive process in the presence of a catalyst of the general formula (XVIII),

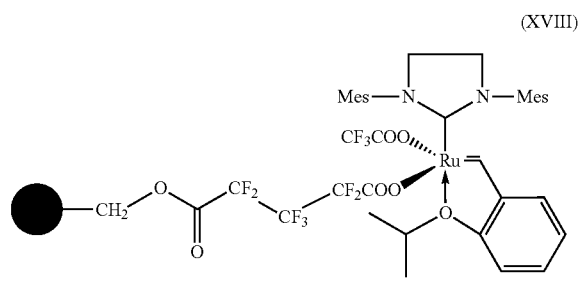 (XVIII)

where the symbol

represents a support.

The support is preferably a poly(styrene-divinylbenzene) copolymer (PS-DVB).

These catalysts of the formula (XVIII) are known in principle from Chem. Eur. J. 2004 10, 777-784 and can be obtained by the preparative methods described there.

All the abovementioned catalysts of the formulae (I), (IV)-(XVI), (XVIII) and (IXX) can either be used as such for the NBR metathesis or can be applied to and immobilized on a solid support. As solid phases or supports, it is possible to use materials which firstly are inert towards the reaction mixture of the metathesis and secondly do not impair the activity of the catalyst. It is possible to use, for example, metals, glass, polymers, ceramic, organic polymer spheres or inorganic sol-gels for immobilizing the catalyst.

The catalysts of all the abovementioned general and specific formulae (I), (IV)-(XVI), (XVIII) and (IXX) are highly suitable for the metathetic degradation of nitrile rubber.

In the process according to the invention, a nitrile rubber is subjected to a metathesis reaction in the presence of a catalyst of the general formula (I).

The amount of the catalyst used according to the invention for the metathesis depends on the nature and the catalytic activity of the specific catalyst. The amount of catalyst used is from 5 to 1000 ppm of noble metal, preferably from 5 to 500 ppm, in particular from 5 to 250 ppm, based on the nitrite rubber used.

The NBR metathesis can be carried out without a coolefin or in the presence of a coolefin. This is preferably a straight-chain or branched $C_2$-$C_{16}$-olefin. Suitable coolefins are, for example, ethylene, propylene, isobutene, styrene, 1-hexene and 1-octene. Preference is given to using 1-hexene or 1-octene. If the coolefin is liquid (as in the case of, for example, 1-hexene), the amount of coolefin is preferably in the range 0.2-20% by weight based on the nitrile rubber used. If the coolefin is a gas, as in the case of, for example, ethylene, the amount of coolefin is selected so that a pressure in the range $1\times10^5$ Pa-$1\times10^7$ Pa, preferably a pressure in the range from $5.2\times10^5$ Pa to $4\times10^6$ Pa, is established in the reaction vessel at room temperature.

The metathesis reaction can be carried out in a suitable solvent which does not deactivate the catalyst used and also does not adversely affect the reaction in any other way. Preferred solvents include but are not restricted to dichloromethane, benzene, toluene, methyl ethyl ketone, acetone, tetrahydrofuran, tetrahydropyran, dioxane and cyclohexane. The particularly preferred solvent is chlorobenzene. In some cases, when the coolefin itself can function as solvent, e.g. in the case of 1-hexene, the addition of a further additional solvent can also be omitted.

The concentration of the nitrile rubber used in the reaction mixture of the metathesis is not critical, but care naturally has to be taken to ensure that the reaction is not adversely affected by an excessively high viscosity of the reaction mixture and the mixing problems associated therewith. The concentration of NBR in the reaction mixture is preferably in the range from 1 to 20% by weight, particularly preferably in the range from 5 to 15% by weight, based on the total reaction mixture.

The metathetic degradation is usually carried out at a temperature in the range from 10° C. to 150° C., preferably in the range from 20° C. to 100° C.

The reaction time depends on a number of factors, for example, on the type of NBR, the type of catalyst, the catalyst concentration used and the reaction temperature. The reaction is typically complete within three hours under normal conditions. The progress of the metathesis can be monitored by standard analytical methods, e.g. by GPC measurement or by determination of the viscosity.

As nitrile rubbers ("NBR"), it is possible to use copolymers or terpolymers which comprise repeating units of at least one conjugated diene, at least one α,β-unsaturated nitrile and, if desired, one or more further copolymerizable monomers in the metathesis reaction.

The conjugated diene can be of any nature. Preference is given to using ($C_4$-$C_6$) conjugated dienes. Particular preference is given to 1,3-butadiene, isoprene, 2,3-dimethylbutadiene, piperylene or mixtures thereof. Very particular preference is given to 1,3-butadiene and isoprene or mixtures thereof. Especial preference is given to 1,3-butadiene.

As α,β-unsaturated nitrile, it is possible to use any known α,β-unsaturated nitrile, preferably a $(C_3-C_5)$ α,β-unsaturated nitrile such as acrylonitrile, methacrylonitrile, ethacrylonitrile or mixtures thereof. Particular preference is given to acrylonitrile.

A particularly preferred nitrile rubber is thus a copolymer of acrylonitrile and 1,3-butadiene.

Apart from the conjugated diene and the α,β-unsaturated nitrile, it is possible to use one or more further copolymerizable monomers known to those skilled in the art, e.g. α,β-unsaturated monocarboxylic or dicarboxylic acids, their esters or amides. As α,β-unsaturated monocarboxylic or dicarboxylic acids, preference is given to fumaric acid, maleic acid, acrylic acid and methacrylic acid. As esters of α,β-unsaturated carboxylic acids, preference is given to using their alkyl esters and alkoxyalkyl esters. Particularly preferred alkyl esters of α,β-unsaturated carboxylic acids are methyl acrylate, ethyl acrylate, butyl acrylate, butyl methacrylate, 2-ethylhexyl acrylate, 2-ethylhexyl methacrylate and octyl acrylate. Particularly preferred alkoxyalkyl esters of α,β-unsaturated carboxylic acids are methoxyethyl (meth) acrylate, ethoxyethyl (meth)acrylate and methoxyethyl (meth)acrylate. It is also possible to use mixtures of alkyl esters, e.g. those mentioned above, with alkoxyalkyl esters, e.g. in the form of those mentioned above.

The proportions of conjugated diene and α,β-unsaturated nitrile in the NBR polymers to be used can vary within wide ranges. The proportion of or of the sum of the conjugated dienes is usually in the range from 40 to 90% by weight, preferably in the range from 55 to 75% by weight, based on the total polymer. The proportion: of or of the sum of the α,β-unsaturated nitriles is usually from 10 to 60% by weight, preferably from 25 to 45% by weight, based on the total polymer. The proportions of the monomers in each case add up to 100% by weight. The additional monomers can be present in amounts of from 0 to 40% by weight, preferably from 0.1 to 40% by weight, particularly preferably from 1 to 30% by weight, based on the total polymer. In this case, corresponding proportions of the conjugated diene or dienes and/or of the α,β-unsaturated nitrile or nitrites are replaced by the proportions of the additional monomers, with the proportions of all monomers in each case adding up to 100% by weight.

The preparation of nitrile rubbers by polymerization of the abovementioned monomers is adequately known to those skilled in the art and is comprehensively described in the polymer literature.

Nitrile rubbers which can be used for the purposes of the invention are also commercially available, e.g. as products from the product range of the trade names Perbunan® and Krynac® from Lanxess Deutschland GmbH.

The nitrile rubbers used for the metathesis have a Mooney viscosity (ML 1+4 at 100° C.) in the range from 30 to 70, preferably from 30 to 50. This corresponds to a weight average molecular weight $M_w$ in the range 200 000-500 000, preferably in the range 200 000-400 000. The nitrile rubbers used also have a polydispersity $PDI=M_w/M_n$, where $M_w$ is the weight average molecular weight and $M_n$ is the number average molecular weight, in the range 2.0-6.0 and preferably in the range 2.0-4.0.

The determination of the Mooney viscosity is carried out in accordance with ASTM standard D 1646.

The nitrile rubbers obtained by the metathesis process according to the invention have a Mooney viscosity (ML 1+4 at 100° C.) in the range 5-30, preferably 5-20. This corresponds to a weight average molecular weight $M_w$ in the range 10 000-200 000, preferably in the range 10 000-150 000. The nitrile rubbers obtained also have a polydispersity PDI $M_w/M_n$, where $M_n$ is the number average molecular weight, in the range 1.5-4.0, preferably in the range 1.7-3.

The metathetic degradation process according to the invention can be followed by a hydrogenation of the degraded nitrile rubbers obtained. This can be carried out in the manner known to those skilled in the art.

It is possible to carry out the hydrogenation with use of homogeneous or heterogeneous hydrogenation catalysts. It is also possible to carry out the hydrogenation in situ, i.e. in the same reaction vessel in which the metathetic degradation has previously also been carried out and without the necessity of isolating the degraded nitrile rubber. The hydrogenation catalyst is simply added to the reaction vessel.

The catalysts used are usually based on rhodium, ruthenium or titanium, but it is also possible to use platinum iridium, palladium, rhenium, osmium, cobalt or copper either as metal or preferably in the form of metal compounds (cf., for example, U.S. Pat. No. 3,700,637, DE-A-25 39 132, EP-A-0 134 023, DE-A-35 41 689, DE-A-35 40 918, EP-A-0 298 386, DE-A-35 29 252, DE-A-34 33 392, U.S. Pat. No. 4,464, 515 and U.S. Pat. No. 4,503,196).

Suitable catalysts and solvents for a hydrogenation in the homogeneous phase are described below and are also known from DE-A-25 39 132 and EP-A-0 471 250.

The selective hydrogenation can be achieved, for example, in the presence of a rhodium- or ruthenium-containing catalyst. It is possible to use, for example, a catalyst of the general formula

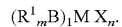

where M is ruthenium or rhodium, the radicals $R_1$ are identical or different and are each a $C_1$-$C_8$-alkyl group, a $C_4$-$C_8$-cycloalkyl group, a $C_6$-$C_{15}$-aryl group or a $C_7$-$C_{15}$-aralkyl group. B is phosphorus, arsenic, sulphur or a sulphoxide group S=O, X is hydrogen or an anion, preferably halogen and particularly preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine)rhodium(III) chloride and tris(dimethyl sulphoxide)rhodium(III) chloride and also tetrakis (triphenylphosphine)rhodium hydride of the formula $(C_6H_5)_3P)_4RhH$ and the corresponding compounds in which the triphenylphosphine has been completely or partly replaced by tricyclohexylphosphine. The catalyst can be utilized in small amounts. An amount in the range 0.01-1% by weight, preferably in the range 0.03-0.5% by weight and particularly preferably in the range 0.1-0.3% by weight, based on the weight of the polymer, is suitable.

It is usually appropriate to use the catalyst together with a cocatalyst which is a ligand of the formula $R^1_m B$, where $R^1$, m and B have the meanings given above for the catalyst. Preferably, m is 3, B is phosphorus and the radicals $R^1$ can be identical or different. Preference is given to cocatalysts having trialkyl, tricycloalkyl, triaryl, triaralkyl, diarylmonoalkyl, diaryl-monocycloalkyl, dialkyl-monoaryl, dialkyl-monocycloalkyl, dicycloalkyl-monoaryl or dicycloalkyl-monoaryl radicals.

Examples of cocatalysts may be found in, for example, U.S. Pat. No. 4,631,315. A preferred cocatalyst is triphenylphosphine. The cocatalyst is preferably used in amounts in the range 0.3-5% by weight, preferably in the range 0.54% by weight, based on the weight of the nitrile rubber to be hydrogenated. Furthermore, the weight ratio of the rhodium-containing catalyst to the cocatalyst is preferably in the range from 1:3 to 1:55, more preferably in the range from 1:5 to 1:45. Based on 100 parts by weight of the nitrile rubber to be hydrogenated, it is appropriate to use from 0.1 to 33 parts by weight of the cocatalyst, preferably from 0.5 to 20 parts by weight and very particularly preferably from 1 to 5 parts by weight, in particular more than 2 but less than 5 parts by weight, of cocatalyst per 100 parts by weight of the nitrile rubber to be hydrogenated.

The practical implementation of this hydrogenation is adequately known to those skilled in the art from U.S. Pat. No. 6,683,136. It is usually carried out by treating the nitrile rubber to be hydrogenated in a solvent such as toluene or monochlorobenzene with hydrogen at a temperature in the range from 100 to 150° C. and a pressure in the range from 50 to 150 bar for from 2 to 10 hours.

For the purposes of the present invention, hydrogenation is a reaction of the double bonds present in the starting nitrile rubber to an extent of at least 50%, preferably 70-100%, particularly preferably 80-100%.

When heterogeneous catalysts are used, these are usually supported catalysts based on palladium which are, for example, supported on carbon, silica, calcium carbonate or barium sulphate.

After conclusion of the hydrogenation, a hydrogenated nitrile rubber having a Mooney viscosity (ML 1+4 at 100° C.), measured in accordance with ASTM standard D 1646, in the range from 10 to 50, preferably from 10 to 30, is obtained. This corresponds to a weight average molecular weight $M_w$ in the range 2000-400 000 g/mol, preferably in the range 20 000-200 000. The hydrogenated nitrile rubbers obtained also have a polydispersity $PDI=M_w/M_n$, where $M_w$ is the weight average molecular weight and $M_n$ is the number average molecular weight, in the range 1-5 and preferably in the range 1.5-3.

EXAMPLES

Metathetic Degradation of Nitrite Rubber in the Presence of Various Ru Catalysts In the following examples, it is shown that, in each case at the same amount of ruthenium, the metathesis activity of the catalysts of the general structural formula (I) is higher than when the Grubbs II catalyst is used.

The following catalysts were used:
"Hoveyda Catalyst" (According to the Invention):

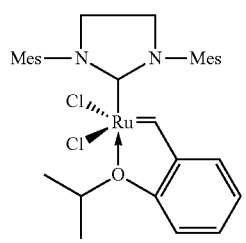

The Hoveyda catalyst was procured from Aldrich under the product number 569755.
"Grela Catalyst" (According to the Invention):

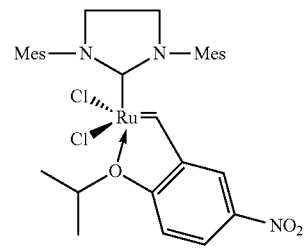

The Grela catalyst was prepared by the method published in J. Org. Chem. 2004, 69, 6894-6896.
Grubbs II Catalyst (Comparison):

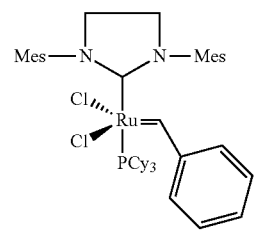

The Grubbs II catalyst was procured from Materia (Pasadena/Calif.).

The degradation reactions described below were carried out using the nitrile rubber Perbunan®NT 3435 from Lanxess Deutschland GmbH. This nitrile rubber had the following characteristic properties:

| | |
|---|---|
| Acrylonitrile content: | 35% by weight |
| Mooney viscosity (ML 1 + 4 @100° C.): | 34 Mooney units |
| Residual moisture content: | 1.8% by weight |
| $M_w$: | 240 000 g/mol |
| $M_n$: | 100 000 g/mol |
| PDI ($M_w/M_n$): | 2.4 |

In the text that follows, this nitrile rubber is referred to as NBR for short.
General Description of the Metathesis Reactions Carried Out The metathetic degradation was in each case carried out using 293.3 g of chlorobenzene (hereinafter referred to as "MCB"/from Aldrich) which had been distilled and made inert by passing argon through it at room temperature before use. 40 g of NBR were dissolved therein at room temperature over a period of 10 hours. 0.8 g (2 phr) of 1-hexene was in each case added to the NBR-containing solution and the mixture was stirred for 30 minutes to homogenize it.

The metathesis reactions were carried out using the amounts of starting materials indicated in the following tables at room temperature.

The Ru-containing catalysts were in each case dissolved in 20 g of MCB at room temperature under argon. The addition of the catalyst solutions to the NBR solutions in MCB was carried out immediately after the preparation of the catalyst solutions. After the reaction times indicated below in the tables, about 5 ml were in each case taken from the reaction solutions and immediately admixed with about 0.2 ml of ethyl vinyl ether to stop the reaction and subsequently diluted with 5 ml of DMAc (N,N-dimethylacetamide from Aldrich). 2 ml of the solutions were in each case placed in a GPC bottle and diluted with DMAc to 3 ml. Before carrying out the GPC analysis, the solutions were in each case filtered by means of a 0.2 μm syringe filter made of Teflon (Chromafil PTFE 0.2 μm; from Machery-Nagel). The GPC analysis was subsequently carried out using a Waters instrument (Mod. 510). The analysis was carried out using a combination of 4 columns from Polymer Laboratories: 1) PLgel 5 μm Mixed-C, 300×7.5 mm, 2) PLgel 5 μm Mixed-C, 300×7.5 mm, 3) PLgel 3 μm Mixed-E, 300×7.5 mm, and 4) PLgel 3 μm Mixed-E, 300×7.5 mm.

The calibration of the GPC columns was carried out using linear poly(methyl methacrylate) from Polymer Standards Services. An RI detector from Waters (Waters 410) was used as detector. The analysis was carried out at a flow rate of 0.5 ml/min using DMAc at 70° C. as eluent. The GPC curves were evaluated using software from Millenium.

The following characteristic properties were determined by means of GPC analysis both for the original NBR rubber (before degradation) and for the degraded nitrile rubbers:

$M_w$ [kg/mol]: weight average molar mass
$M_n$ [kg/mol]: number average molar mass
PDI: width of the molar mass distribution ($M_w/M_n$)

Example Series 1-3

Activity Comparison of the "Hoveyda Catalyst" with the "Grubbs II Catalyst" in the Presence of 2 phr of 1-Hexene In the example series 1 and 2, the activity of the "Hoveyda catalyst" was compared with that of the "Grubbs II catalyst" at two ruthenium contents (23.8 ppm and 161.4 ppm). These activity comparisons were carried out using 2.0 phr of 1-hexene.

In example series 3, the metathetic degradation was carried out using the "Hoveyda catalyst" at a ruthenium addition of 8.6 ppm and an amount of 1-hexene of 2.0 phr.

Example 1.1

According to the Invention

"Hoveyda Catalyst" Using 161 ppm of Ruthenium and 2.0 phr of 1-Hexene

| NBR | "Hoveyda catalyst" (MW = 626.14 g/mol) | | | 1-Hexene | | |
|---|---|---|---|---|---|---|
| Amount [g] | Amount [mg] | Amount [phr] | Ru [ppm] | Amount [g] | Amount [phr] | Temperature [° C.] |
| 40 | 40 | 0.1 | 161.4 | 0.8 | 2.0 | 23 |

| | "Hoveyda catalyst"/Reaction time [min.] | | | | |
|---|---|---|---|---|---|
| Analytical data | 0 | 30 | 60 | 185 | 425 |
| $M_w$ [kg/mol] | 240 | 22 | 16 | 14 | 13 |
| $M_n$ [kg/mol] | 100 | 14 | 12 | 10 | 10 |
| PDI | 2.4 | 1.57 | 1.33 | 1.40 | 1.30 |

The degraded nitrile rubbers obtained in Example 1.1 were gel-free.

Example 1.2

Comparison

"Grubbs II Catalyst" Using 161 ppm of Ruthenium and 2.0 phr of 1-Hexene

| NBR | "Grubbs II catalyst" | | | 1-Hexene | | |
|---|---|---|---|---|---|---|
| Amount [g] | Amount [mg] | Amount [phr] | Ru [ppm] | Amount [g] | Amount [phr] | Temperature [° C.] |
| 40 | 54.2 | 0.14 | 161.4 | 0.8 | 2.0 | 23 |

| | "Grubbs II catalyst"/Reaction time [min.] | | | | |
|---|---|---|---|---|---|
| Analytical data | 0 | 30 | 60 | 185 | 425 |
| $M_w$ [kg/mol] | 240 | 86 | 65 | 35 | 28 |
| $M_n$ [kg/mol] | 100 | 40 | 35 | 19 | 17 |
| PDI | 2.4 | 2.13 | 1.87 | 1.88 | 1.68 |

Comparison of the decrease in the molecular weights $M_w$ and $M_n$ in Examples 1.1 and 1.2 shows that at an amount of ruthenium of 161 ppm the activity of the "Hoveyda catalyst" is significantly higher than that of the "Grubbs II catalyst". When using the "Hoveyda catalyst", the metathesis reaction is complete after about 30 minutes, while when the "Grubbs II catalyst" is used the metathetic degradation is still not complete after a reaction time of 425 minutes. At in each case the same reaction times, the "Hoveyda catalyst" gives lower molar masses than the "Grubbs II catalyst".

Example 2.1

According to the Invention

"Hoveyda Catalyst" Using 23.8 ppm of Ruthenium and 2.0 phr of 1-Hexene

| NBR | "Hoveyda catalyst" (MW = 626.14 g/mol) | | | 1-Hexene | | |
|---|---|---|---|---|---|---|
| Amount [g] | Amount [mg] | Amount [phr] | Ru [ppm] | Amount [g] | Amount [phr] | Temperature [° C.] |
| 40 | 5.9 | 0.014 | 23.8 | 0.8 | 2.0 | 23 |

| | "Hoveyda catalyst"/Reaction time [min.] | | | | |
|---|---|---|---|---|---|
| Analytical data | 0 | 30 | 60 | 185 | 425 |
| $M_w$ [kg/mol] | 240 | 79 | 77 | 72 | 70 |
| $M_n$ [kg/mol] | 100 | 55 | 40 | 40 | 39 |
| PDI | 2.4 | 1.44 | 1.90 | 1.82 | 1.77 |

The nitrile rubbers degraded using the "Hoveyda catalyst" in the trial 2.1 were gel-free.

Example 2.2

Comparison

"Grubbs II Catalyst" Using 23.8 ppm of Ruthenium and 2.0 phr of 1-Hexene

| NBR | "Grubbs II catalyst" | | | 1-Hexene | | Temperature |
|---|---|---|---|---|---|---|
| Amount | Amount | Amount | Ru | | | |
| [g] | [mg] | [phr] | [ppm] | [g] | [phr] | [° C.] |
| 40 | 8 | 0.02 | 23.8 | 0.8 | 2.0 | 23 |

| | "Grubbs II catalyst"/Reaction time [min.] | | | | | |
|---|---|---|---|---|---|---|
| Analytical data | 0 | 30 | 60 | 185 | 425 | 1325 |
| $M_w$ [kg/mol] | 240 | 190 | 180 | 150 | 125 | 118 |
| $M_n$ [kg/mol] | 100 | 67 | 63 | 59 | 62 | 51 |
| PDI | 2.4 | 2.83 | 2.86 | 2.54 | 2.02 | 2.31 |

Comparison of the molecular weights $M_w$ and $M_n$, in the trials 2.1 and 2.2 shows that at identical amounts of ruthenium (24 ppm) and of 1-hexene (2 phr) the activity of the Hoveyda catalyst (V) is significantly higher than that of the Grubbs II catalyst. At in each case identical reaction times, the Hoveyda catalyst (V) gave lower molar masses than the Grubbs II catalyst.

Example 3

According to the Invention

"Hoveyda Catalyst" Using 8.6 ppm of Ruthenium and 2.0 phr of 1-Hexene

| NBR | "Hoveyda catalyst" | | | 1-Hexene | | Temperature |
|---|---|---|---|---|---|---|
| Amount | Amount | Amount | Ru | | | |
| [g] | [mg] | [phr] | [ppm] | [g] | [phr] | [° C.] |
| 40 | 2.12 | 0.0053 | 8.56 | 0.8 | 2.0 | 23 |

| | "Hoveyda catalyst"/Reaction time [min.] | | | | | |
|---|---|---|---|---|---|---|
| Analytical data | 0 | 30 | 60 | 185 | 425 | 1325 |
| $M_w$ [kg/mol] | 240 | 154 | 136 | 121 | 100 | 86 |
| $M_n$ [kg/mol] | 100 | 69 | 60 | 54 | 48 | 45 |
| PDI | 2.4 | 2.23 | 2.27 | 2.24 | 2.08 | 1.91 |

A comparison of Example 3 ("Hoveyda catalyst"/8.6 ppm of ruthenium) with 2.2 ("Grubbs II catalyst"/23.8 ppm of ruthenium) showed that the mean molecular weights $M_w$ and $M_n$ at identical reaction times are lower when using the "Hoveyda catalyst" than when using the "Grubbs II catalyst" despite a significantly lower amount of ruthenium.

The nitrile rubbers degraded using the "Hoveyda catalyst" in this example series 3 were also gel-free.

Example Series 4 and 5

Activity Comparison of the "Grela Catalyst" with the "Grubbs II Catalyst" in the Presence of 2 phr of 1-Hexene In the example series 4 and 5, the activity of the "Grela catalyst" was compared with that of the "Grubbs II catalyst" at two ruthenium contents (23-24 ppm and 60 ppm). The activity comparisons were in each case carried out using 2.0 phr of 1-hexene.

Example 4.1

According to the Invention

"Grela Catalyst" Using 22.9 ppm of Ruthenium and 2 phr of 1-Hexene

| NBR | "Grela catalyst" (MW: 671.13 g/mol) | | | 1-Hexene | | |
|---|---|---|---|---|---|---|
| Amount | Amount | Amount | Ru | Amount | Amount | Temperature |
| [g] | [mg] | [phr] | [ppm] | [g] | [phr] | [° C.] |
| 40 | 6.1 | 0.015 | 22.9 | 0.8 | 2.0 | 23 |

| | "Grela catalyst"/Reaction time [min.] | | | | |
|---|---|---|---|---|---|
| Analytical data | 0 | 30 | 60 | 185 | 425 |
| $M_w$ [kg/mol] | 240 | 109 | 98 | — | 86 |
| $M_n$ [kg/mol] | 100 | 61 | 50 | — | 44 |
| PDI | 2.4 | 1.79 | 1.96 | — | 1.95 |

Example 4.2

Comparison

"Grubbs II Catalyst" Using 23.8 ppm of Ruthenium and 2 phr of 1-Hexene

| NBR | "Grubbs II catalyst" | | | 1-Hexene | | |
|---|---|---|---|---|---|---|
| Amount | Amount | Amount | Ru | Amount | Amount | Temperature |
| [g] | [mg] | [phr] | [ppm] | [g] | [phr] | [° C.] |
| 40 | 8.0 | 0.02 | 23.8 | 0.8 | 2.0 | 23 |

| | "Grubbs II catalyst"/Reaction time [min.] | | | | |
|---|---|---|---|---|---|
| Analytical data | 0 | 30 | 60 | 185 | 425 |
| $M_w$ [kg/mol] | 240 | 190 | 180 | 150 | 125 |
| $M_n$ [kg/mol] | 100 | 67 | 63 | 59 | 62 |
| PDI | 2.4 | 2.83 | 2.86 | 2.54 | 2.02 |

Comparison of the mean molecular weights $M_w$ and $M_n$ in the trials 4.1 and 4.2 shows that at identical amounts of ruthenium (22.9/23.8 ppm) and of 1-hexene (2 phr) the activity of the "Grela catalyst" is significantly higher than that of the "Grubbs II catalyst". At in each case identical reaction times, the "Grela catalyst" gave lower molecular weights than the "Grubbs II catalyst".

The nitrile rubbers degraded using the "Grela catalyst" in the trial 4.1 were gel-free.

Example 5.1

According to the Invention

"Grela Catalyst" Using 59.5 ppm of Ruthenium and 2.0 phr of 1-Hexene

| NBR | "Grela catalyst" (MW: 671.13 g/mol) | | | 1-Hexene | | |
|---|---|---|---|---|---|---|
| Amount [g] | Amount [mg] | Amount [phr] | Ru [ppm] | Amount [g] | Amount [phr] | Temperature [° C.] |
| 40 | 15.8 | 0.04 | 59.5 | 0.8 | 2.0 | 23 |

| | "Grela catalyst"/Reaction time [min.] | | | | |
|---|---|---|---|---|---|
| Analytical data | 0 | 30 | 60 | 185 | 425 |
| $M_w$ [kg/mol] | 240 | 37 | 35 | 31 | 31 |
| $M_n$ [kg/mol] | 100 | 23 | 22 | 20 | 20 |
| PDI | 2.4 | 1.61 | 1.59 | 1.50 | 1.55 |

Example 5.2

According to the Invention

"Grubbs II Catalyst" Using 59.6 ppm of Ruthenium and 2.0 phr of 1-Hexene

| NBR | "Grubbs II catalyst" | | | 1-Hexene | | |
|---|---|---|---|---|---|---|
| Amount [g] | Amount [mg] | Amount [phr] | Ru [ppm] | Amount [g] | Amount [phr] | Temperature [° C.] |
| 40 | 20.0 | 0.05 | 59.6 | 0.8 | 2.0 | 23 |

| | "Grubbs II catalyst"/Reaction time [min.] | | | | |
|---|---|---|---|---|---|
| Analytical data | 0 | 30 | 60 | 185 | 425 |
| $M_w$ [kg/mol] | 240 | 185 | 165 | 77 | 60 |
| $M_n$ [kg/mol] | 100 | 84 | 78 | 38 | 35 |
| PDI | 2.4 | 2.13 | 2.11 | 2.03 | 1.71 |

Comparison of the mean molecular weights $M_w$ and $M_n$ in the trials 5.1 and 5.2 shows that at identical amounts of ruthenium (60 ppm) and of 1-hexene (2 phr) the activity of the "Grela catalyst" is significantly higher than that of the "Grubbs II catalyst". When using the "Grela catalyst", final values for $M_w$ and $M_n$ were achieved after about 185 minutes, while when the "Grubbs II catalyst" was used the metathetic degradation was not yet complete after a reaction time of 425 minutes. At in each case identical reaction times, the "Grela catalyst" gave lower molecular weights than the "Grubbs II catalyst".

The nitrile rubbers degraded using the "Grela catalyst" in the trial 5.1 were gel-free.

Example 6

Activity Comparison of the "Hoveyda Catalyst" with the "Grubbs II Catalyst" without Addition of 1-Hexene In the trials 6.1 and 6.2, the activity of the "Hoveyda catalyst" was compared with that of the "Grubbs II catalyst" at a ruthenium content of 60 ppm. The activity comparison was carried out without the use of 1-hexene.

Example 6.1

According to the Invention

"Hoveyda Catalyst" Using 59.3 ppm of Ruthenium without Addition of 1-Hexene

| NBR | "Hoveyda catalyst" | | | 1-Hexene | | |
|---|---|---|---|---|---|---|
| Amount [g] | Amount [mg] | Amount [phr] | Ru [ppm] | Amount [g] | Amount [phr] | Temperature [° C.] |
| 40 | 14.7 | 0.0368 | 59.3 | 0 | 0 | 23 |

| | "Hoveyda catalyst"/Reaction time [min.] | | | | |
|---|---|---|---|---|---|
| Analytical data | 0 | 30 | 60 | 185 | 425 |
| $M_w$ [kg/mol] | 240 | 149 | 143 | 132 | 108 |
| $M_n$ [kg/mol] | 100 | 66 | 63 | 62 | 54 |
| PDI | 2.4 | 2.26 | 2.27 | 2.13 | 2.00 |

Example 6.2

Comparison

"Grubbs II Catalyst" Using 59.6 ppm of Ruthenium without Addition of 1-Hexene

| NBR | "Grubbs II catalyst" | | | 1-Hexene | | |
|---|---|---|---|---|---|---|
| Amount [g] | Amount [mg] | Amount [phr] | Ru [ppm] | Amount [g] | Amount [phr] | Temperature [° C.] |
| 40 | 20.0 | 0.05 | 59.6 | 0 | 0 | 23 |

| | "Grubbs II catalyst"/Reaction time [min.] | | | | |
|---|---|---|---|---|---|
| Analytical data | 0 | 30 | 60 | 185 | 425 |
| $M_w$ [kg/mol] | 240 | 206 | — | 173 | 158 |
| $M_n$ [kg/mol] | 100 | 92 | — | 74 | 75 |
| PDI | 2.4 | 2.24 | — | 2.34 | 2.11 |

Comparison of the mean molecular weights $M_w$ and $M_n$ in Examples 6.1 and 6.2 shows that at a comparable amount of ruthenium (about 60 ppm) without addition of 1-hexene the activity of the "Hoveyda catalyst" is higher than that of the "Grubbs II catalyst". When using the "Hoveyda catalyst", the mean molecular weights $M_w$ and $M_n$ are lower than when using the "Grubbs II catalyst" at identical reaction times.

The degraded nitrite rubbers obtained using the "Hoveyda catalyst" without use of 1-hexene in Example 6.1 were gel-free.

What is claimed is:

1. A process for degrading a nitrile rubber comprising subjecting the nitrile rubber to a metathesis reaction in the presence of a catalyst of the general formula (I),

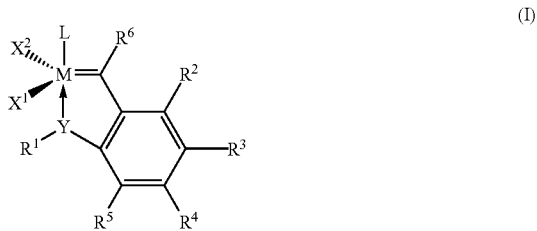

where
M is ruthenium or osmium,
Y is oxygen (O), sulphur (S), an N—$R^1$ radical or a P—$R^1$ radical,
$X^1$ and $X^2$ are identical or different ligands,
$R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, each of which may optionally be substituted by one or more alkyl, halogen, alkoxy, aryl or heteroaryl radicals,
$R^2$, $R^4$, $R^5$ are identical or different and are each hydrogen, organic or inorganic radicals,
$R^3$ is —$SO_2N(CH_3)_2$,
$R^6$ is hydrogen or an alkyl, alkenyl, alkynyl or aryl radical and
L is a ligand.

2. The process according to claim 1, wherein L in the general formula (I) is a $P(R^7)_3$ radical, where the radicals $R^7$ are each, independently of one another, $C_1$-$C_6$-alkyl, $C_3$-$C_8$-cycloalkyl or aryl or a substituted or unsubstituted imidazolidine radical ("Im").

3. The process according to claim 2, wherein the imidazolidine radical (Im) has a structure of the general formula (IIa) or (IIb),

where
$R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-aryloxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, $C_1$-$C_{20}$-alkylsulphonyl, $C_1$-$C_{20}$-alkylsulphonate, $C_6$-$C_{20}$-arylsulphonate or $C_1$-$C_{20}$-alkylsulphinyl.

4. The process according to claim 3, wherein $R^{10}$ and $R^{11}$ in the imidazolidine radical (Im) are identical or different and are each straight-chain or branched $C_1$-$C_{10}$-alkyl, $C_3$-$C_{10}$-cycloalkyl, $C_6$-$C_{24}$-aryl, $C_1$-$C_{10}$-alkylsulphonate, or $C_6$-$C_{10}$-arylsulphonate.

5. The process according to claim 3, wherein the imidazolidine radical (Im) has the structure (IIIa), (IIIb), (IIIc), (IIId), (IIIe) or (IIIf),

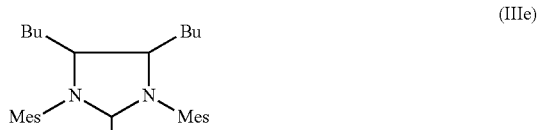

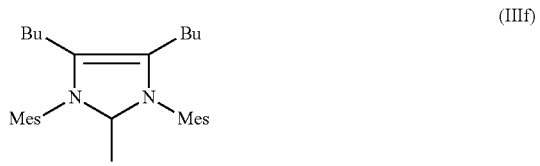

where Mes is in each case a 2,4,6-trimethylphenyl radical.

6. The process according to claim 1 or 2, wherein $X^1$ and $X^2$ in the general formula (I) are identical or different and are each hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-allylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or $C_1$-$C_{20}$-alkylsulphinyl.

7. The process according to claim 6, wherein $X^1$ and $X^2$ in the general formula (I) are identical or different and are each halogen, benzoate, $C_1$-$C_5$-carboxylate, $C_1$-$C_5$-alkyl, phenoxy, $C_1$-$C_5$-alkoxy, $C_6$-$C_{24}$-arylthiol, $C_6$-$C_{24}$-aryl or $C_1$-$C_5$-alkylsulphonate.

8. The process according to claim 6, wherein $X^1$ and $X^2$ in the general formula (I) are identical and are each halogen, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulphonate).

9. The process according to claim 1 or 2, wherein the radical $R^1$ in the general formula (I) is a $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphinyl radical, each of which may optionally be substituted by one or more alkyl, halogen, alkoxy, aryl or heteroaryl radicals.

10. The process according to claim 1 or 2, wherein the radical $R^6$ is hydrogen, a $C_1$-$C_{30}$-alkyl radical, a $C_2$-$C_{20}$-alkenyl radical, a $C_2$-$C_{20}$-alkynyl radical or a $C_6$-$C_{24}$-aryl radical.

11. The process according to claim 1, wherein a catalyst of the general formula (IV)

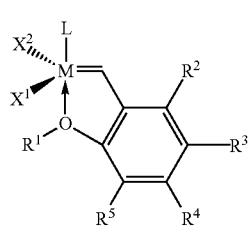

(IV)

where
M, L, $X^1$, $X^2$, $R^1$, $R^2$, $R^3$, $R^4$ and $R^5$ have the meanings given for the general formula (I), is used.

12. The process according to claim 11, wherein, in the general formula (IV),
M is ruthenium,
$X^1$ and $X^2$ are both chlorine,
$R^1$ is an isopropyl radical,
$R^2$, $R^4$, $R^5$ are all hydrogen,
$R^3$ is —$SO_2N(CH_3)_2$, and
L is a substituted or unsubstituted imidazolidine radical of the formula (IIa) or (IIb),

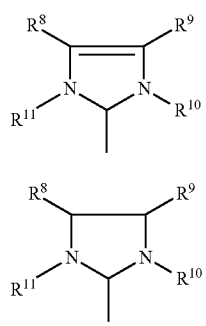

(IIa)

(IIb)

where
$R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_6$-$C_{24}$-arylthio, $C_1$-$C_{20}$-alkylsulphonyl, $C_1$-$C_{20}$-alkylsulphonate, $C_6$-$C_{24}$-arylsulphonate or $C_1$-$C_{20}$-alkylsulphinyl.

13. The process according to claim 1, wherein a catalyst of the formula (IXX),

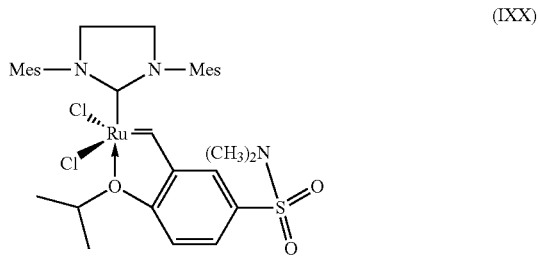

(IXX)

where Mes is a 2,4,6-trimethylphenyl radical, is used.

14. The process according to claim 1, wherein a catalyst of the general formula (XVI),

(XVI)

where $D^1$, $D^2$, $D^3$ and $D^4$ each have a structure of the general formula (XVII) which is bound via the methylene group to the silicon of the formula (XVI),

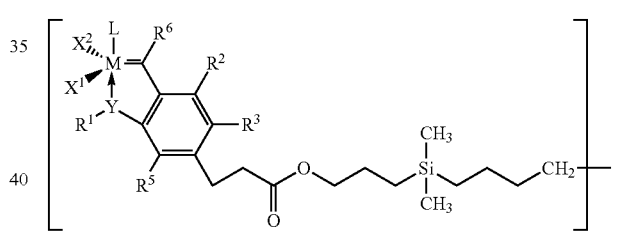

(XVII)

where
M, L, $X^1$, $X^2$, $R^1$, $R^2$, $R^3$, $R^5$ and $R^6$ have the meanings given for the general formula (I), is used.

15. The process according to claim 1, wherein the amount of catalyst used is from 5 to 1000 ppm of noble metal based on the nitrile rubber used.

16. The process according to claim 1, wherein the metathesis is carried out without a coolefin or in the presence of a coolefin.

17. The process according to claim 1, wherein copolymers or terpolymers which comprise repeating units of at least one conjugated diene, at least one α,β-unsaturated nitrile and, one or more further copolymerizable monomers are used as nitrile rubbers.

18. The process according to claim 1, wherein the nitrile rubbers used have a Mooney viscosity (ML 1+4 at 100° C.) in the range from 30 to 70.

19. The process according to claim 1 wherein the degraded nitrile rubber is subsequently subjected to a hydrogenation.

20. The process according to claim 3, wherein $R^{10}$ and $R^{11}$ in the imidazolidine radical (Im) are identical or different and are each straight-chain or branched $C_1$-$C_{10}$-alkyl selected from the group consisting of i-propyl or neopentyl.

21. The process according to claim 3, wherein $R^{10}$ and $R^{11}$ in the imidazolidine radical (Im) are identical or different and are each straight-chain or branched $C_3$-$C_{10}$-cycloalkyl selected from adamantyl.

22. The process according to claim 3, wherein $R^{10}$ and $R^{11}$ in the imidazolidine radical (Im) are identical or different and are each straight-chain or branched $C_6$-$C_{24}$-aryl selected from phenyl.

23. The process according to claim 3, wherein $R^{10}$ and $R^{11}$ in the imidazolidine radical (Im) are identical or different and are each straight-chain or branched $C_1$-$C_{10}$-alkylsulphonate selected from methanesulphonate.

24. The process according to claim 3, wherein $R^{10}$ and $R^{11}$ in the imidazolidine radical (Im) are identical or different and are each straight-chain or branched $C_6$-$C_{10}$-arylsulphonate selected from p-toluenesulphonate.

25. The process according to claim 6, wherein $X^1$ and $X^2$ in the general formula (I) are identical or different and are each halogen selected from the group consisting of fluorine, chlorine or bromine.

26. The process according to claim 1 or 2, wherein the radicals $R^2$, $R^4$ and $R^5$ in the general formula (I) are identical or different and are halogen selected from the group containing chlorine or bromine.

27. The process according to claim 15, wherein the amount of catalyst used is from 5 to 500 ppm based on the nitrile rubber used.

28. The process according to claim 27, wherein the amount of catalyst used is in the range from 5 to 250 ppm based on the nitrile rubber used.

29. The process according to claim 1, wherein the metathesis is carried out without a coolefin or in the presence of a coolefin which is a straight-chain or branched $C_2$-$C_{16}$-olefin.

30. The process according to claim 29, wherein the straight-chain or branched $C_2$-$C_{16}$-olefin, selected from the group consisting of ethylene, propylene, isobutene, styrene, 1-hexene or 1-octene.

31. The process according to claim 18, wherein the nitrile rubbers used have a Mooney viscosity (ML 1+4 at 100° C.) in the range from 30 to 50.

32. The process according to claim 19 wherein the degraded nitrile rubber is subsequently subjected to a hydrogenation in situ.

* * * * *